(12) United States Patent
Berkemeier et al.

(10) Patent No.: US 8,900,499 B2
(45) Date of Patent: Dec. 2, 2014

(54) METHOD OF AND DEVICE FOR PRODUCING ENDLESS STRIPS

(75) Inventors: Frank Berkemeier, Grefrath (DE); Jorg Leiffels, Wuppertal (DE)

(73) Assignee: SaarGummi Technologies S.a.r.l., Schengen (LU)

( * ) Notice: Subject to any disclaimer, the term of this patent is extended or adjusted under 35 U.S.C. 154(b) by 672 days.

(21) Appl. No.: 13/127,794

(22) PCT Filed: Oct. 16, 2009

(86) PCT No.: PCT/EP2009/007423
§ 371 (c)(1),
(2), (4) Date: May 23, 2011

(87) PCT Pub. No.: WO2010/051908
PCT Pub. Date: May 14, 2010

(65) Prior Publication Data
US 2011/0212301 A1 Sep. 1, 2011

(30) Foreign Application Priority Data

Nov. 5, 2008 (DE) .......................... 10 2008 056 052

(51) Int. Cl.
| B29C 47/32 | (2006.01) |
| B29C 47/00 | (2006.01) |
| B29C 47/12 | (2006.01) |
| B29C 47/08 | (2006.01) |
| B29C 47/90 | (2006.01) |
| B29C 45/56 | (2006.01) |
| B29C 47/88 | (2006.01) |

(52) U.S. Cl.
CPC .............. *B29C 47/32* (2013.01); *B29C 47/003* (2013.01); *B29C 2045/5695* (2013.01); *B29C 47/126* (2013.01); *B29C 47/0866* (2013.01); *B29C 47/90* (2013.01); *B29C 45/56* (2013.01); *B29C 47/884* (2013.01); *B29C 47/0021* (2013.01)
USPC ...... 264/177.16; 264/165; 428/358; 425/381; 425/447; 425/441; 425/451; 425/224

(58) Field of Classification Search
CPC .................... B29C 45/5605; B29C 2045/5695
See application file for complete search history.

(56) References Cited

U.S. PATENT DOCUMENTS

| 5,441,687 A * | 8/1995 | Murasaki et al. ............. 264/167 |
| 2003/0160356 A1 | 8/2003 | D'Angelo |
| 2010/0221500 A1* | 9/2010 | Steiner et al. ................. 428/174 |

FOREIGN PATENT DOCUMENTS

| AT | 504904 | 9/2008 |
| DE | 893120 | 10/1953 |
| DE | 2023488 | 11/1970 |

* cited by examiner

*Primary Examiner* — Benjamin Schiffman
(74) *Attorney, Agent, or Firm* — James Creighton Wray

(57) ABSTRACT

The invention relates to a method and to a device for producing endless strands, particularly plastic strands having structure in the longitudinal axis. According to the invention, form elements (14, 15) bounding a form cavity (4) are brought together and aligned with each other in rows for making a form cavity (4), the form cavity (4) is moved in the longitudinal axis of the rows and casting material is brought into the form cavity (4) at a gate location running against the direction of motion through a side opening (5) of the form cavity (4), and the form cavity is opened continuously at a distance from the gate location while moving the form elements apart, in order to demold an endless strand solidified in the form cavity (4).

28 Claims, 3 Drawing Sheets

METHOD OF AND DEVICE FOR PRODUCING ENDLESS STRIPS

This application claims the benefit of German Application No. 10 2008 056 052.9 filed Nov. 5, 2008 and PCT/EP2009/007423 filed Oct. 16, 2009, which are hereby incorporated by reference in their entirety as if fully set forth herein.

The invention relates to a method of producing endless strips, particularly strips of plastics material structured in longitudinal direction, with the features of claim 1 as well as to a device with the features of claim 15 for performing the method.

Use is made of the so-called corrugator method or a method similar thereto for the production of endless plastics material strips, particularly those in which the cross-section changes in longitudinal direction and the production of which by extrusion is therefore hardly possible. In that case, casting mould parts arranged in a row in strip longitudinal direction in a casting mould producing the strip migrate from the rear to the front end of casting mould in correspondence with the production speed of the strip and are returned from there to the front end for continuous fresh formation of the casting mould. The moulding material hardened within the mould cavity closes the front end of the mould cavity. The moved casting mould parts continuously transport moulding material, which is filled into the mould cavity at the open end thereof and in the longitudinal direction thereof, in direction towards the front end of the casting mould.

DE-PS 893 120 describes a method and a device for producing endless strips, wherein a casting mould open at its ends is formed by a stationary casting mould section, into which a hot channel of injection-moulding equipment opens, and a movable casting mould section constructed as a collar on a turntable. The moulding material hardens within the cavity which is formed by the two sections and open at both sides. The endless strip transported away through the collar-shaped casting mould section is then conducted away at an angular spacing from the casting mould by the turntable. The strip cross-section cannot have any undercuts which would prevent this conducting away.

A method of and a device for producing plastics material strips, thus strips of defined length, is evident from AT 504 904 B1, wherein an elongate mould cavity has an inlet opening extending over the entire length of the cavity. Engaging in the elongate inlet opening is a shaping element which partially closes the opening and in the end surface—which faces the mould cavity and completes the mould cavity—of which a hot channel for the feed of moulding material opens. During production of the strips the shaping element and the mould cavity are moved relative to one another, wherein the moulding material within the region of the mould cavity closed by the shaping element continuously hardens.

The invention has the object of creating a new method of and a new device for producing endless strips, which enable production of undercut strip cross-sectional geometries with a lower level of constructional outlay than the known methods and devices for producing such endless strips.

The method, which fulfils this object, according to the invention is characterised in that, for formation of a mould cavity, mould elements bounding the mould cavity are brought together and arranged in a row, that the mould cavity moves in the longitudinal direction of the row and moulding material is introduced into the mould cavity at a gate point progressing against the movement direction and that the mould cavity is opened continuously at a spacing from the gate point while moving the mould elements apart so as to remove an endless strip, which has solidified in the mould cavity, from the mould.

It is preferably provided that a rotary element with a ring-shaped mould cavity is rotated about the axis of the ring, that moulding material is introduced into the mould cavity at a gate point progressing against the rotation and that the mould cavity is partially opened continuously against the rotation at an angular spacing from the gate point in order to remove an endless strip, which has solidified in the mould cavity, from the mould.

Correspondingly, a preferred form of embodiment of a device according to the invention for performance of this method comprises a rotary element with a ring-shaped mould cavity rotatable about the axis of the ring, equipment for introducing moulding material into the mould cavity at a gate point progressing against the rotation and equipment for partial opening of the mould cavity at an angular spacing from the gate point.

According to the invention, moulding material, for example a thermoplastic, is introduced, preferably under pressure, for example with the help of injection-moulding equipment, into the moving or rotating mould cavity at a preferably stationary gate point and transported away by the movement or rotation of the mould cavity from the gate point in direction towards a hardening region. The hardening region remains substantially fixed. The moulding material passes into the mould cavity oppositely to the movement direction or rotational direction in a given case only over a certain lead path, wherein a counter-pressure acting as a holding pressure builds up with respect to the injection-moulding pressure of the moulding material. Up to the opening for removal from the mould the hardened moulding material then cools down further. Coming into consideration as plastics material, apart from thermoplastics are, for example, also thermosetting plastics and elastomers, particularly thermoplastic elastomers.

The mould cavity can have closable openings which are distributed over its entire length or its annular circumference and which are respectively exposed on reaching the gate point. The movement of the mould cavity or rotation of the rotary element can take place in steps from opening to opening or continuously at, for example, constant speed.

In a particularly preferred form of embodiment of the invention the introduction of the moulding material into the mould cavity is carried out continuously through an inlet opening, which is continuous over the entire length of the mould cavity, for the moulding material, which opening is continuously closed in a limited length or angular region, which extends in movement direction or rotational direction and optionally also against the movement direction or rotational direction from the gate point; if within this length or angular region the moulding material hardens at least in the wall region of the mould cavity, it is no longer possible for any moulding material outside this region to escape through the unclosed ring opening. The length or angular region extending in movement direction or rotational direction forms a sizing path. The length or angular region extending from the gate point against the movement direction or rotational direction forms the above-mentioned lead path into which moulding material also passes.

Heat can be extracted from and/or supplied to the mould cavity in a length or angular region including the gate point, thus, for example, within the sizing path and the lead path. Heat is preferably supplied with the lead path, which ensures that the moulding material remains liquid in this region. In the region of the sizing path, thereagainst, heat is extracted and thus ensures that the moulding material hardens within the sizing path. The latter procedure is particularly advantageous in the case of processing thermoplastic elastomers.

The heat extraction and/or heat feed can be carried out by way of a shaping element, which continuously closes the inlet opening and the end surface—which faces the mould cavity—of which bounds and completes the mould cavity. Relative movements occur between the end surface and the hardened moulding material, which, however, do not lead to a frictional moment obstructing rotation of the rotary element in view of the fact that the width of the annular inlet opening is small by comparison with the circumference of the mould cavity.

The movement of the mould cavity, particularly the rotation of the rotary element, the feed of moulding material, the moulding material temperature and the heat dissipation and feed are preferably so matched to one another that the hardening region always remains fixed with respect to the overall device. Equally, the speed, particularly rotational speed, and the formation of the opening for removal from the mould are matched to one another so that the opening for removal from the mould always lies at the same spacing from the gate point. Alternatively, variable positions of the hardening region and/or of the opening for removal of the mould would also be possible.

In order to the form the mould cavity, mould elements bounding the mould cavity are arranged tangentially in a row, wherein the mould elements for formation of the opening for removal from the mould are then moved progressively laterally, for example in axial and/or radial direction of the rotary element, out of their initial setting and back again.

Appropriate movement equipment can rotate together with the rotary element, wherein, for example, control cams, electromechanical, pneumatic or hydraulic drives come into consideration for the movement drive. In addition, media such as, for example, oil and air for temperature control as well as electric current and electric control signals can be supplied by way of the rotary element, for example the axis of rotation thereof.

The feed of the moulding material can be controlled in dependence on the cross-section of the strip, which can change in strip longitudinal direction.

The invention is explained in more detail in the following on the basis of an exemplifying embodiment and the accompanying drawings, which refer to this exemplifying embodiment and in which:

DETAILED DESCRIPTION OF THE PREFERRED EMBODIMENTS

Figure 1:
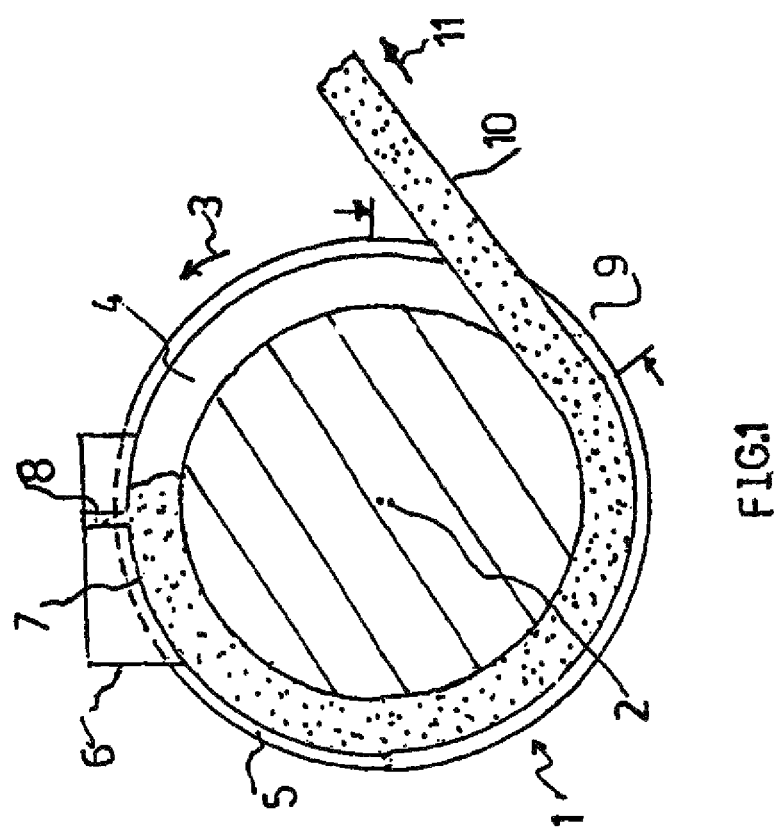
FIG. 1 shows a schematic illustration of a device according to the invention in sectional side view.

A device, which is schematically illustrated in FIG. 1, according to the invention comprises a rotary element 1 which is rotatable about an axis 2 in the direction indicated by an arrow 3 by a drive device (not shown).

An annular mould cavity 4, which is concentric with the axis 2, is formed in the rotary body 1 and has a narrow inlet opening 5 running continuously around the outer circumference of the mould cavity 4.

Engaging in the inlet opening 5 is a web of a shaping element 6, in the end surface 7—which faces the mould cavity 4—of which a hot channel 8 for the feed of moulding material, namely molten plastics material in the exemplifying embodiment in question, opens. The shaping element 6 closes the encircling inlet opening 5 over a defined circumferential or angular region and in this region completes, by the mentioned end surface 7, the mould cavity 4 so that it is closed all round in cross-section.

Moulding material, which in the illustrated exemplifying embodiment is a thermoplastic, fed through the hot channel 8 is continuously transported away from the gate point in accordance with arrow 3 through the rotation of the rotary body 1 together with the mould cavity 4. A hardening region, which progresses oppositely to the direction of rotation of the mould cavity 4 and thus remains in fixed location, is formed near the mouth or gate point of the hot channel 8.

At 10, as explained more specifically further below with reference to FIGS. 2 and 3, the mould cavity 4 can partially open over a defined angular region 9 and an endless strip 10 solidified in the mould cavity 4 can be led out of the mould cavity 4 and, for example, wound up on a roll (not shown).

Figure 2:
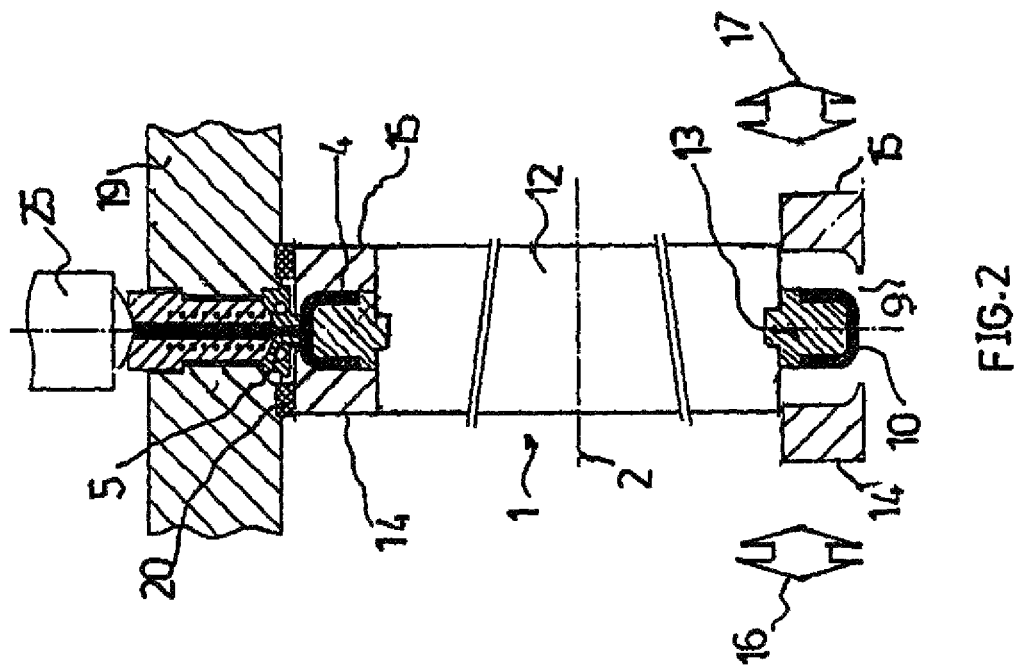
FIG. 2 shows one form of embodiment of the device of FIG. 1 in a sectional side view turned through 90° relative to the side view of FIG. 1.

According to FIG. 2 the element 1 rotatable about the axis 2 of rotation can comprise a central disc 12 with a peripheral profiled ring 13. The peripheral profiled ring 13 forms, in the illustrated exemplifying embodiment, together with the movable mould elements 14 and 15 a mould cavity 4 serving for formation of an endless strip 10 with U-shaped cross-section. Whereas the profiled ring 13 runs in closed form around the peripheral edge surface of the central disc 12, in order to form the annular mould cavity 4 several mould elements 14 and 15 are arranged in a row segmentally, for example four such mould elements extending over an angle of 90° on each side. Significantly more, than four mould elements can be provided in distribution over the circumference of the rotary element.

The mould element surfaces facing the strip can have projections and/or depressions, for example in order to form incisions and/or passages in the U-limbs of the strip.

Equipment for moving the mould elements, for example control cams or electromechanical movement equipment, can be rotated together with the rotary element 1.

Figure 3:
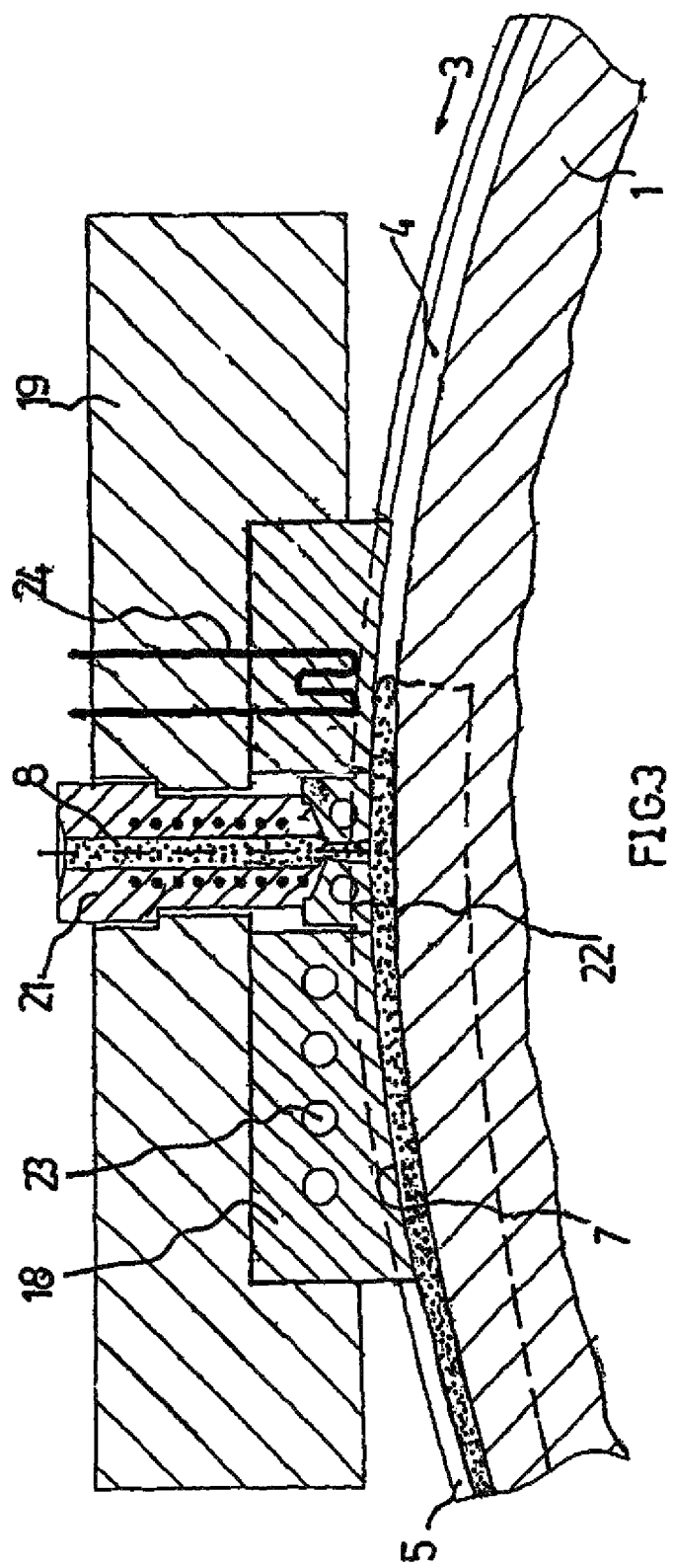
FIG. 3 shows a detail illustration of the device of FIG. 2 in a side view turned through 90° relative to the view of FIG. 2, and FIGS. 4 and 5 show further exemplifying embodiments for devices according to the invention.

One possibility for embodiment of the mould element 6 schematically illustrated in FIG. 1 is in addition evident from FIGS. 2 and 3. An insert member 18 forming the end surface 7 is inserted in a frame mount 19 of the device. As can be seen from FIG. 2, the rotary element 1 is additionally mounted at 20 at the frame mount 19. A hot channel 8 forms a hot channel nozzle element 21 as well as a temperature-controllable gate insert 22 connected therewith as an end member, wherein the gate insert 20 is inserted into a bore in the insert member 18. Moulding material can be fed under pressure by way of injection-moulding equipment 25.

A part, which extends in rotational direction according to arrow 3 from the hot channel 8, of the insert member 18 forms a sizing path, in which heat from the mould cavity 4 or moulding material contained therein can be dissipated. Cooling channels 23 serve for the heat dissipation. The sizing path extends over for example, an angle of 30°.

A part of the insert member 18 extending oppositely to the direction of rotation from the hot channel 8 forms a lead path and is heatable by a schematically illustrated heating element 24. In addition, the insert member 18 could have, in the region of the lead path, cooling channels corresponding with the cooling channels 23 and could selectably also be coolable. The lead path extends over, for example, an angle of 10°.

In operation of the device described in the foregoing the rotary element 1 is moved at, for example, constant rotational speed, wherein its peripheral edge surface runs past the annular opening 5 of the mould cavity 4 in the direction of the arrow 3 at the mouth of the hot channel 8 and wherein the end surface of the insert member 18 continuously partially closes the mould cavity 4 in the region of the calibrating path and the lead path.

Moulding material fed under pressure through the hot channel 8 passes into the mould cavity 4, the rotational movement of which ensures that it is constantly transported away in the direction of the arrow 3 and flows into the lead path only over a part of its length. A counter-pressure acting as holding pressure with respect to the pressure of the moulding material builds up in the lead path by virtue of the rotational movement.

In the case of use of discontinuously operating injection-moulding units several such units can, for producing an uninterrupted material feed flow, be connected in alternation with the hot channel 8. Alternatively, a moulding material flow can be continuously fed by a method similar to extrusion.

Heating of the lead path prevents hardening of moulding material in this region. Conversely, heat dissipation on the sizing path ensures that solidification of the moulding material within this region is completed and no moulding material can escape from the opening 5, which is exposed again after the end of the calibration path, of the mould cavity 4.

All influencing parameters, i.e. the rotational speed of the rotary element 1, the moulding material feed through the hot channel 8, the temperature of the moulding material, the feed of heat in the region of the lead path and the dissipation of heat in the region of the calibration path, are so dimensioned that a quasi-static state with an approximately stationary hardening region, which does not change its position or changes its position only slightly with respect to the gate point, i.e. the mouth of the hot channel 8, is formed within the sizing path and optionally the lead path.

The resulting relative movement between the hardened moulding material and the end surface 7, which bounds the mould cavity 4, of the shaping element 6 or the insert 18 does not prevent rotation of the rotary element 1, since it is confined to a narrow region corresponding with the width of the annular opening 5 and only a small frictional moment is produced.

At an angular spacing of preferably more than 180° from the gate point the rotating mould cavity 4 is opened, for the purpose of removal of the formed endless strip 10 from the mould, in that the segmental oppositely disposed mould elements 14 and 15 are drawn apart in succession according to the arrows 16 and 17. The endless strip 10, which is U-shaped in cross-section, can then detach in radial direction from the profiled ring 13 and be taken out, for example tangentially, from the mould cavity 4 as shown in FIG. 1. The mould elements 14 and 15 are subsequently brought back together so that the mould cavity 4 is produced again at the latest in the angular region of the lead path of the outlet cross-section.

It will be obvious that, depending on the respective strip to be produced, mould elements could be formed in a different way and in a different number with respect to the illustrated exemplifying embodiment.

If the requisite amount of material changes in strip longitudinal direction as a consequence of, for example, periodically repeating passages and/or incisions, the moulding material feed can be correspondingly controlled by the injection-moulding equipment 25.

In departure from the illustrated exemplifying embodiment the continuous annular opening 5 could also be interrupted.

The continuous material strand formed by the continuous annular opening could be arranged at a location different from that shown, for example at the free end of one of the U-limbs.

Several mould cavities, for example concentric with the axis of rotation of the rotary element, can be provided on a single rotary element for simultaneous production of several endless strips.

In a further form of embodiment of the invention further equipment for introduction of a further moulding material, which differs from the moulding material, into recesses in the produced endless strip as well as equipment for widening the mould cavity while exposing the recesses are provided at an angular spacing from the equipment for introducing moulding material into the mould cavity. A thermoplastic elastomer, for example, comes, into consideration as further moulding material.

Further exemplifying embodiments and devices for producing endless strips are described in the following on the basis of FIGS. 4 and 5, wherein identical or equivalent parts are denoted by the same reference numerals as in the preceding figures and wherein the letter a or b is added to the respective reference numerals.

Figure 4:
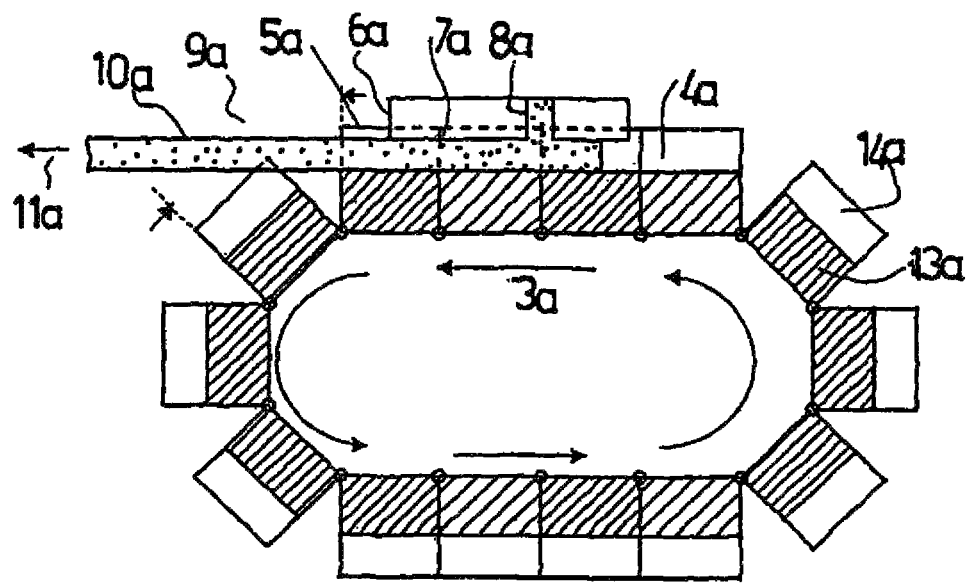

According to FIG. 4, mould elements connected to form a closed chain and comprising respective sections 13a and 14a form, together with corresponding elements (not, shown) opposite thereto, a linear mould cavity 4a. In order to form an opening 9a for removal from the mould, movement equipment—which travels with the chain or is stationary—for movement apart of the mould elements can be provided, which equipment brings the mould elements back together at the latest at the opposite end of the mould cavity 4a in order to reconstitute the mould cavity 4a. Two chains mutually opposite only in the region of the mould cavity could also lie in a single plane.

Figure 5:
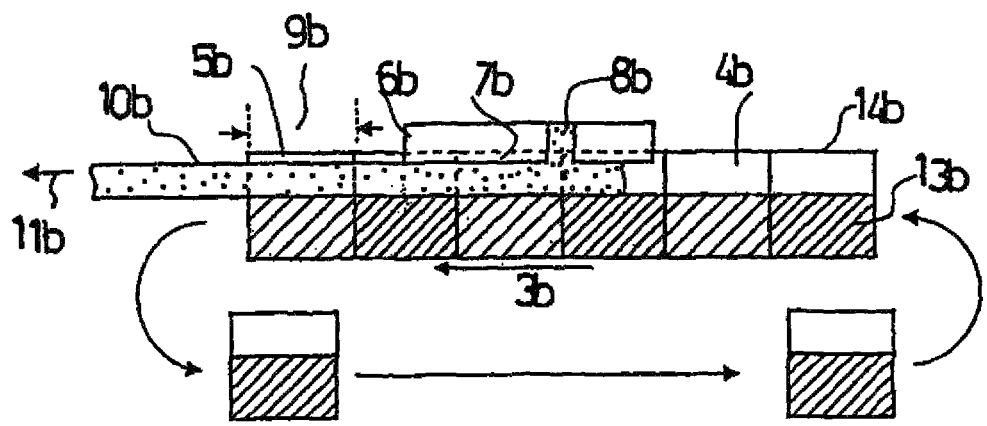

The exemplifying embodiment of FIG. 5 differs from the preceding exemplifying embodiment in that mould elements comprising sections 13b and 14b are not connected to form a chain, but can be led back independently of one another by suitable movement equipment from an opening 9b for removal from the mould to the end—which is opposite the opening 9b for removal from the mould—of a mould cavity 4b for continuous reconstitution of the mould cavity moved according to arrow 3b.

In both exemplifying embodiments an inlet opening 5a which extends over the entire length of the mould cavity and which is narrow by comparison with the circumference of the cross-section of the mould cavities 4a and 4b is formed.

In the afore-described method, variants similar to variants of the injection-moulding method such as, for example, the inlay of decorative films, the inlay of endless or discrete inlay parts of other materials and the like can also be realised so that endless strips can be made from plastics material with special features.

It is possible to produce with the help of the afore-described method, for example, reinforcing inlays of plastics material for sealing strips.

The invention claimed is:
1. Method of producing endless strips, particularly strips of plastics material structured in longitudinal direction, wherein for formation of a mould cavity (4) mould elements (14, 15) bounding the mould cavity are brought together and arranged in a row, that the mould cavity (4) is moved in the longitudinal of the row and casting material is introduced into the mould cavity (4) through a lateral opening (5) of the mould cavity (4) at a gate point progressing against the direction of movement and that the mould cavity is opened continuously at a spacing from the gate point while moving the mould elements (14, 15) apart so as to remove from the mould an endless strip solidified in the mould cavity (4) wherein the mould cavity (4) is opened when the moving mould elements (14, 15) move apart from one another, and wherein the moving mould elements (14, 15) and inlet opening (5) enclose the mould cavity (4) to form a U-shaped cross-section.

2. Method according to claim 1, wherein a rotary element (1) wherein the mould cavity (4) is ring-shaped and is rotated about an axis (2) of the ring, that moulding material is introduced into the mould cavity (4) at a gate point progressing against the direction of movement as a rotational direction and that at an angular spacing from the gate point the mould cavity (4) is partially opened continuously against the rotation in order to remove from the mould an endless strip (10) solidified in the mould cavity (4).

3. Method according claim 2, wherein for formation of the ring-shaped mould cavity (4) mould elements (14, 15) bounding the mould cavity (4) are arranged in a row in circumferential direction and the mould parts (14, 15) for formation of the opening (9) for removal from the mould are progressively laterally offset, in particular axially drawn apart.

4. Method according to claim 3, wherein devices for movement of the mould parts (14, 15) are rotated together with the rotary element.

5. Method according to claim 1 wherein the introduction of the moulding material into the mould cavity (4) is carried out continuously and an inlet opening (5), which is continuous over the entire length of the mould cavity (4), for the moulding material is continuously closed in a length or angular region extending from the gate point in the movement or rotational direction and optionally against the movement or rotational direction.

6. Method according to claim 1, wherein heat is continuously extracted from and/or supplied to the mould cavity (4) in a length or angular region including the gate point.

7. Method according to claim 6, wherein heat is fed or is extracted from the mould cavity (4) in the length or angular region extending in the movement or rotational direction from the gate point and heat is fed to the length or angular region extending against the movement or rotational direction from the gate point.

8. Method according to claim 6 wherein the extraction of heat and/or the feed of heat is carried out by way of a shaping element (6) continuously closing the inlet opening (5).

9. Method according to claim 1, wherein the movement of the mould cavity (4), the feed of moulding material, the moulding material temperature, the dissipation and feed of heat and the continuous opening of the mould cavity (4) are so, matched to one another that with respect to the device as a whole a stationary hardening, region and/or a fixed position of the opening (9) for removal from the mould results or result.

10. Method according to claim 1, wherein the moulding material is introduced under pressure into the mould cavity (4).

11. Method according to claim 1, wherein a feed of the moulding material is controlled in dependence on a strip cross-section changing in the longitudinal direction of the endless strip.

12. Method according to claim 1, wherein the mould elements (13a, 14a; 13b, 14b) are, for continuous reconstitution of the mould cavity (4a, 4b), transported from the opening (9a, 9b) for removal from the mould back to the end of the mould cavity (4a, 4b) opposite to the opening (9) for removal from the mould.

13. Method according to claim 1, wherein the mould elements (13b, 14b) are connected to form at least one closed chain and in a given case a linear mould cavity (4b) is formed.

14. Endless strip, particularly of plastics material, obtained in accordance with a method according to claim 1.

15. Device for producing endless strips (10), particularly strips of plastics material structured in a longitudinal direction, characterised by a mould cavity (4), which comprises moving mould elements (14, 15) arranged in a row and movable in the longitudinal direction of the row, equipment (21, 22, 25) for introducing moulding material into the mould cavity (4) through a lateral inlet opening (5) at a gate point progressing against a direction of movement and equipment for continuous opening of the mould cavity (4) at a spacing from the gate point in order to remove from the mould cavity (4) an endless strip (10) solidified in the mould cavity (4), wherein the mould cavity (4) is opened when the moving mould elements (14, 15) move apart from one another, and wherein the moving mould elements (14, 15) and inlet opening (5) enclose the mould cavity (4) to form a U-shaped cross-section.

16. Device according to claim 15, characterised by a rotary element (1), wherein the mould cavity (4) is ring shaped and rotatable about an axis (2) of the ring, equipment (21, 22, 25) for introducing moulding material into the mould cavity (4) at a gate point progressing against the direction of movement as a rotational direction and equipment for continuous partial opening of the mould cavity (4) at an angular spacing from the gate point in order to remove from the mould an endless strip (10) solidified in the mould cavity (4).

17. Device according to claim 16 wherein equipment (23, 24) for dissipation and/or feed of heat from or to the mould cavity (5) is provided in an angular region including the gate point.

18. Device according to claim 17, wherein the equipment (24) for the feed of heat is provided in a length region or an angular region extending from the gate point against the movement direction or rotational direction.

19. Device according to claim 16, wherein for formation of the mould cavity (4) mould parts (14, 15) arranged in a row segmentally in circumferential direction are provided and the equipment for partial opening of the mould cavity (4) comprises equipment for axial and/or radial movement of the mould parts (14, 15).

20. Device according to claim 19, wherein the movement equipment is rotatable together with the rotary element (1).

21. Device according to claim 15 wherein the mould cavity (4) has an inlet opening (5), which is continuous over the length of the mould cavity (4), for the moulding material, and that equipment for closing the inlet opening in a length or angular region extending from the gate point in a movement direction or rotational direction and in a given case against the movement direction or rotational direction is provided.

22. Device according to claim 21, wherein heat is fed or extracted from the device by a shaping element (6) continuously closing the inlet opening (5).

23. Device according to claim 15, wherein the equipment (21, 22, 25) comprises injection-moulding equipment (25) for introducing moulding material.

24. Device according to claim 15, wherein equipment for control of a feed of the moulding material in dependence on a changing cross-section of the endless strip in a strip longitudinal direction is provided.

25. Device according to claim 15, wherein a single rotary element comprises a plurality of ring-shaped mould cavities for simultaneous production of a plurality of endless strips.

26. Device according to claim 15, wherein further equipment for introducing a further moulding material, which differs from the mould material, into recesses in the produced endless strip and equipment for widening the mould cavity while exposing the recesses are provided at a length spacing or an angular spacing from the equipment for introducing moulding material into the mould cavity.

27. Device according to claim 15, wherein equipment for transport of the mould elements (13a, 14a; 13b, 14b) from the opening (9a, 9b) for removal from the mould back for continuous reconstitution of the mould cavity (4a, 4b) is provided at the end of the mould cavity (4a, 4b) opposite the opening for removal from the mould.

28. Device according to claim 15, wherein the mould elements (13a, 14a) are connected to form at least one closed chain and in a given case a linear mould cavity (4a) is formed.

* * * * *